(12) United States Patent
Koch

(10) Patent No.: US 6,733,069 B2
(45) Date of Patent: May 11, 2004

(54) VEHICLE ROOF

(75) Inventor: Winfried Koch, Fahrzeugdach (DE)

(73) Assignee: JAC Products Deutschland GmbH, Wuppertal (DE)

( * ) Notice: Subject to any disclaimer, the term of this patent is extended or adjusted under 35 U.S.C. 154(b) by 0 days.

(21) Appl. No.: 10/067,091

(22) Filed: Feb. 4, 2002

(65) Prior Publication Data

US 2003/0001412 A1 Jan. 2, 2003

(30) Foreign Application Priority Data

Feb. 6, 2001 (DE) ......................... 101 05 168

(51) Int. Cl.$^7$ .................................. B62D 25/06
(52) U.S. Cl. ..................... 296/210; 296/37.7
(58) Field of Search ............... 296/37.7, 210; 224/309, 326, 329, 331

(56) References Cited

U.S. PATENT DOCUMENTS

| | | | |
|---|---|---|---|
| 4,382,532 A | * 5/1983 | Pflugfelder | 24/331 |
| 4,475,765 A | * 10/1984 | Vogt et al. | 296/210 |
| 5,456,512 A | * 10/1995 | Gibbs et al. | 296/37.7 |
| 6,027,161 A | * 2/2000 | Gondo | 296/214 |

FOREIGN PATENT DOCUMENTS

| | | | |
|---|---|---|---|
| AT | 394164 B | | 2/1992 |
| DE | 1405910 | * | 12/1969 |
| DE | 2551646 | | 11/1975 |
| DE | 197 09 016 A1 | * | 10/1998 |
| DE | 19853820 | | 5/2000 |
| FR | 2 480 211 | | 9/1980 |
| FR | 2 632 595 | * | 6/1988 |
| JP | 09002163 | * | 7/1997 |

* cited by examiner

Primary Examiner—Joseph D. Pape
(74) Attorney, Agent, or Firm—Harness Dickey & Pierce P.L.C.

(57) ABSTRACT

A vehicle roof includes a roof panel having at least one longitudinal side, an upward extending bead integrally formed along the longitudinal side, at least one claw fixedly attached to the bead, and at least one cross member attached to and extending from the claw, across an upper surface of the roof panel. The bead preferably extends along a substantial length of the longitudinal side, and includes an inward relief formed therein to enable attachment of the claw. A roofliner may also be fixedly attached to and run across a lower surface of the roof panel. The vehicle roof, and roofliner preferably define a prefabricated unit.

17 Claims, 1 Drawing Sheet

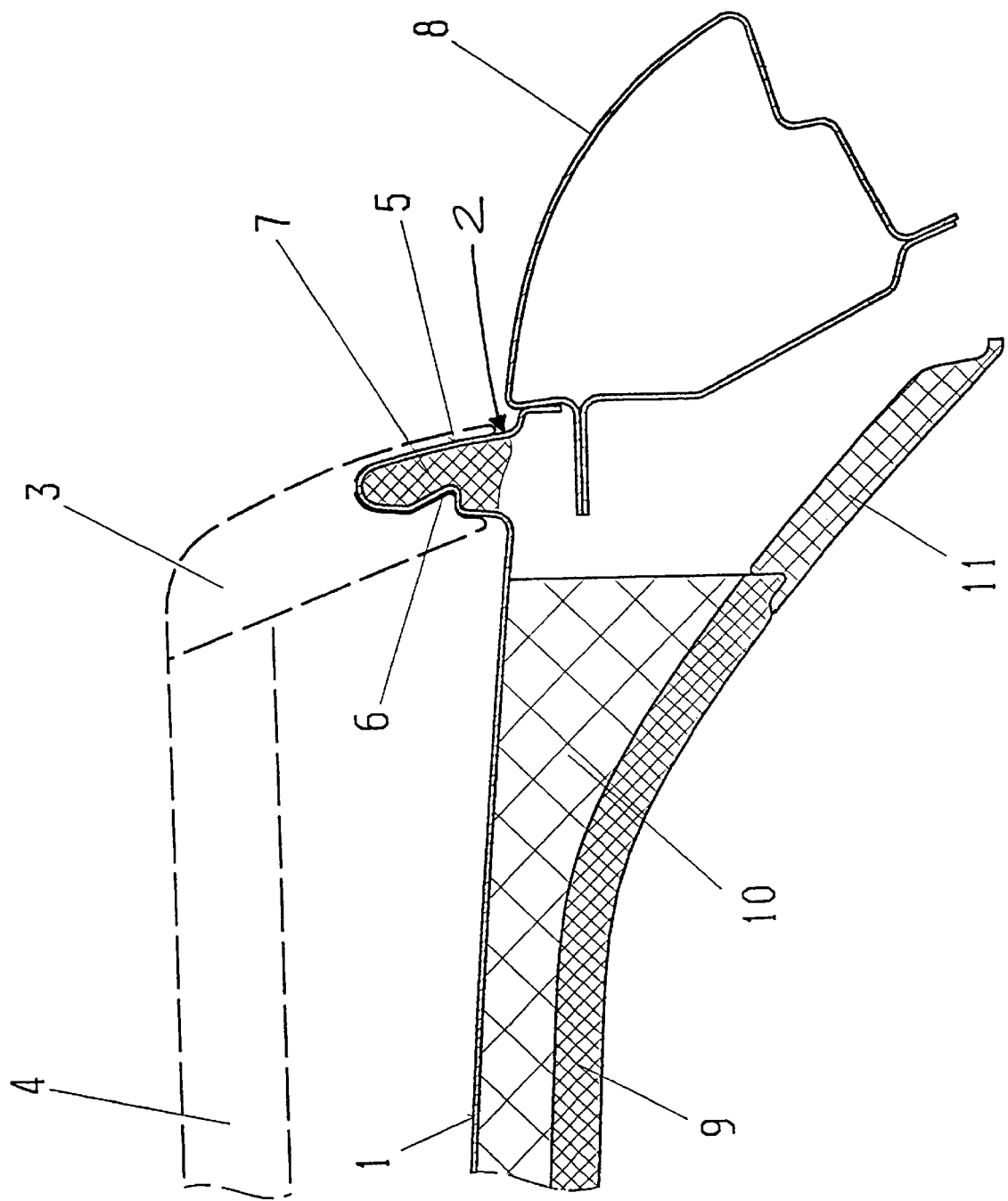

VEHICLE ROOF

FIELD OF THE INVENTION

This invention relates to a vehicle roof for a passenger car (limousine, coupe, station wagon, van, or minibus) with a roof panel.

BACKGROUND OF THE INVENTION

Roof load supports are frequently installed on the roof panel of passenger cars of the aforementioned kind in order to transport very different kinds of objects. On passenger cars of the older generation, the fastening arrangement of roof load supports was located on the drip rails (DE 27 10 222 A1), which are no longer common in modern vehicles. The modern arrangement of roof load supports on a vehicle roof generally provides for roof rails, which are permanently attached to a vehicle roof and to which detachable roof load crossmembers can be attached (DE 28 04 588 A1). A roof rail of the cited art usually consists of at least one boom on each side of the roof and at least two railing feet, each of which carries a boom. The booms and feet are stuck together for assembly and the feet are equipped with threaded bolts whose extended ends are fed through borings in the roof panel. Nuts are attached onto the threaded bolts from the other side of the roof panel (DE C4 004 829). The cost of manufacturing a conventional roof rail is considerable, as is its assembly. Well known is the arrangement of fastening two rails along the longitudinal side regions of the roof panel (DE 198 03 232 A1) and fitting detachable roof rail crossmembers to them. Here too, there is a high expense for manufacturing the rails and assembling them with their sealing problems.

SUMMARY OF THE INVENTION

To solve this task, it is provided according to invention that the longitudinal sides of the roof panel are designed with materially uniform fixtures, which are shaped upwards from the roof panel, consist of beads issuing upwards, and almost extend across the roof panel's entire length.

The special advantage of the invention consists of the fact that the fixtures are no longer rails or bars that are separately manufactured and mounted, but integral components of the vehicle roof, designed as the same piece and materially uniform with the roof panel.

The beads issuing upwards can be manufactured at completely neutral cost and in the same working cycle with the forming work of the roof panel, which must be performed anyway, and they provide the additional advantage of stiffening the roof. Due to the fact that the fixtures, which are designed as beads, extend along nearly the entire length of the roof panel, nearly any desired fastening arrangement for the roof load crossmembers is possible along the entire length of the bead.

Fasteners, such as the claws of the roof load crossbeams, can lock to the fixtures with positive fit in that, in the development of the invention, the fixtures feature, at least in the regions of the crossmember/fastening arrangements, impressions that prevent the crossmembers from shifting in the event of an accident.

To prevent deformation or other damage to the fixtures, another further development of the invention provides that the fixtures designed as beads are internally stiffened with formed pieces inserted or infused into them.

To take into account an effort of car manufacturers to make more extensive use of modular components in the future, another further development of the invention consists of that the roof panel, which is designed with fixtures for the fastening arrangement of roof load crossbeams, forms a prefabricated assembly unit in combination with a roofliner attached to it. Here the roofliner may be fitted with a roofliner covering, and/or interior trim paneling, sun visors, inside rearview mirror, interior lighting devices, cabling, control and display units, sliding roof or sunroof and its framework and driving elements, supporting straps, etc. It is recommended that the prefabricated assembly unit feature a connecting configuration that fits the locations of the pillars' joints and/or the vehicle body's roof frame.

BRIEF DESCRIPTION OF THE DRAWINGS

An example of the invention will be explained in more detail based on the drawing. The drawing shows:

FIG. 1 is a longitudinal section through the side of a vehicle roof's longitudinal edge.

DETAILED DESCRIPTION OF THE PREFERRED EMBODIMENTS

Referring to FIG. 1, the vehicle roof features a roof panel 1 which, on its longitudinal side regions of which only one is illustrated, possesses fixtures 2 shaped upwards for a fastening arrangement of sustainers or claws 3 of roof load crossmembers 4. The drawing of FIG. 1 only illustrates one roof load crossmember 4 with one claw 3.

Every fixture 2 consists of a bead 5 in the roof panel 1 issuing upwards and is thus an integrated component of the roof panel. To produce a connection with positive fit between each claw 3 and each fixture 2, the beads 5 each feature an impression 6, or an inward relief, which a corresponding claw projection, or an outward relief, engages locking tightly. The impression 6 may also extend across nearly the entire length of bead 5. An undesired deformation of fixture 2, which could occur from the claws 3 splitting open too strongly, can be prevented by arranging a formed piece 7 within a cavity of each bead 5.

The roof panel 1 is fastened to a side-panel frame 8 belonging to the vehicle body by a fastening arrangement formed by gluing, soldering, welding, screwing, or riveting. In particular, the fixture 2 has connecting tabs which align the roof panel 1 to the side frame 8 and provide attachment points to fasten the roof panel 1 to the side frame 8. A weatherstrip, which isn't illustrated, or another sealant may be arranged between the roof panel 1 and the side frame 8.

The vehicle roof additionally features the peculiarity, that it may consist of one roof module as illustrated that also features fixtures 2 for the fastening arrangement of roof load crossmembers 4. In the example, the roof module consists of the roof panel 1 with the fixtures 2, a roofliner 9, and an intermediate layer 10 between roof panel 1 and roofliner 9. The roof module consequently features a sandwich construction, wherein the intermediate layer 10 consists of plastic foam, for example. Glued joints can be provided between roof panel 1 and intermediate layer 10 on one side, as well as between the intermediate layer and the roof liner 9 on the other side, wherein both physically-binding and chemically-binding adhesives can be used. A roof frame or pillar lining 11 can be attached to the roof lining 9, as shown in the drawing.

It must also be mentioned that the beads 5 also serve as styling elements of a roof rail, and that the fixtures formed by the beads 5 produce a positive side effect to the extent that they prevent rainwater located on the vehicle roof from penetrating into the passenger compartment when the door is opened.

Although not presented in detail, the roof module may feature one or add-on pieces in pre-assembled arrangement. Roofliner covering, interior trim paneling, sun visors, interior lighting devices, supporting straps, etc. constitute examples.

What is claimed is:

1. A vehicle roof for a passenger car, comprising a roof panel having longitudinal sides on which there are formed materially uniform fixtures for fastening roof load crossmembers, said fixtures being integrally shaped upwards in the form of beads issuing upwards, and extending substantially across an entire length of said roof panel.

2. The vehicle roof according to claim 1, wherein said fixtures feature impressions at least in regions of fastening of said crossmembers.

3. The vehicle roof according to claim 1, wherein said fixtures are internally stiffened with formed pieces inserted thereinto.

4. The vehicle roof according to claim 1, wherein said roof panel includes a roofliner attached thereto for providing a prefabricated assembly unit.

5. The vehicle roof according to claim 4, wherein said prefabricated assembly unit includes a fastening arrangement to couple said prefabricated assembly unit to a vehicle body's roof frame.

6. A vehicle roof assembly, comprising:
   a roof panel including at least one longitudinal side;
   an upward extending bead integrally formed along said longitudinal side;
   at least one claw fixedly attached to said bead; and
   at least one cross member attached to and extending from said claw, across an upper surface of said roof panel.

7. The vehicle roof assembly according to claim 6, wherein said bead extends along a substantial length of said longitudinal side.

8. The vehicle roof assembly according to claim 6, further comprising an inward relief formed in said bead to enable attachment of said claw.

9. The vehicle roof assembly according to claim 8, further comprising an outward relief formed on said claw, said outward relief engaging said inward relief for fixedly attaching said claw to said bead.

10. The vehicle roof assembly according to claim 6, further comprising a formed piece disposed within a cavity of said bead.

11. The vehicle roof assembly according to claim 10, wherein said formed piece is infused into said cavity.

12. The vehicle roof assembly according to claim 6, further comprising a roofliner fixedly attached to and running across a lower surface of said roof panel.

13. The vehicle roof assembly according to claim 6, further comprising connecting tabs formed along said longitudinal side for alignment with and attachment to a fixed vehicle structure.

14. A prefabricated vehicle roof unit, comprising:
   a vehicle roof including a roof panel having at least one longitudinal side, an upward extending bead integrally formed along said longitudinal side, at least one claw fixedly attached to said bead, and at least one cross member attached to and extending from said claw, across an upper surface of said roof panel;
   a roofliner fixedly attached to and running across a lower surface of said vehicle roof; and
   connecting tabs extending from said vehicle roof for alignment with and attachment to a fixed vehicle structure.

15. The prefabricated vehicle roof unit according to claim 14, further comprising an intermediate layer disposed between said roof panel and said roof liner.

16. The prefabricated vehicle roof unit according to claim 14, further comprising a roofliner covering.

17. The prefabricated vehicle roof unit according to claim 14, further comprising a formed piece disposed within a cavity of said bead.

* * * * *